US012497177B1

(12) United States Patent
Bales

(10) Patent No.: US 12,497,177 B1
(45) Date of Patent: Dec. 16, 2025

(54) PARACORD CUTTER

(71) Applicant: Government of the United States, as represented by the Secretary of the Air Force, Wright-Patterson AFB, OH (US)

(72) Inventor: John Bales, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/935,773

(22) Filed: Nov. 4, 2024

Related U.S. Application Data

(60) Provisional application No. 63/608,376, filed on Dec. 11, 2023.

(51) Int. Cl.

| | |
|---|---|
| ***B64D 17/38*** | (2006.01) |
| ***B64D 17/58*** | (2006.01) |
| ***B64D 17/72*** | (2006.01) |
| *B64D 17/26* | (2006.01) |

(52) U.S. Cl.
CPC ........... *B64D 17/386* (2013.01); *B64D 17/58* (2013.01); *B64D 17/725* (2013.01); *B64D 17/26* (2013.01)

(58) Field of Classification Search
CPC .... B64D 17/386; B64D 17/58; B64D 17/725; B64D 17/26
See application file for complete search history.

(56) References Cited

U.S. PATENT DOCUMENTS

| | | | | |
|---|---|---|---|---|
| 645,043 A | | 3/1900 | McCartney | |
| 723,841 A | | 3/1903 | Del Mar | |
| 1,621,357 A | | 3/1927 | Dillenbach | |
| 2,240,675 A | | 5/1941 | Selinger | |
| 4,062,112 A | * | 12/1977 | Lake | H02G 1/005 89/1.14 |
| 4,493,240 A | * | 1/1985 | Norton | B23D 15/145 60/632 |
| 5,177,317 A | * | 1/1993 | Walker | F42B 3/006 114/221 A |
| 5,703,315 A | * | 12/1997 | Coggan | B64D 1/02 114/221 A |
| 7,207,253 B2 | * | 4/2007 | Smolders | B64D 17/386 83/639.4 |
| 11,072,030 B2 | * | 7/2021 | Selby | B26D 5/12 |
| 11,472,056 B2 | * | 10/2022 | Brickett | A01K 75/00 |
| 2016/0207605 A1 | * | 7/2016 | Jensen | B64B 1/40 |
| 2020/0023978 A1 | * | 1/2020 | Fox, Jr. | B64D 1/12 |

* cited by examiner

*Primary Examiner* — Justin M Benedik
(74) *Attorney, Agent, or Firm* — AFMCLO/JAZ; Matthew D. Fair

(57) ABSTRACT

A paracord cutter mechanism includes a shuttle tube extending between first and second ends. A paracord aperture is formed through the tube proximate the first end thereof. A rod is threadingly engaged into the first end of the tube and a cutting board formed at a distal end thereof. A cutter shuttle is configured to travel from the second end of the tube toward the first end of the tube after a pyrotechnic explosive cap is detonated. The cutter shuttle severs a paracord after engaging at a sufficiently high speed and forcing the paracord into the cutting board. A parachute can be deployed and then detached by severing different paracords.

20 Claims, 4 Drawing Sheets

PARACORD CUTTER

Pursuant to 37 C.F.R. § 1.78 (a) (4), this application claims the benefit of and priority to prior filed co-pending Provisional Application Ser. No. 63/608,376, filed Dec. 11, 2023, which is expressly incorporated herein by reference

RIGHTS OF THE GOVERNMENT

The invention described herein may be manufactured and used by or for the Government of the United States for all governmental purposes without the payment of any royalty.

TECHNICAL FIELD

The present disclosure generally relates to a release mechanism for a parachute, and more particularly, but not exclusively to a paracord cutter device that operates to sever a cord to deploy the parachute and/or release a payload from that parachute during an airdrop.

BACKGROUND

Parachute release mechanisms are designed to deploy the parachute and/or release the parachute from a payload (human or cargo) at a predetermined altitude. A failure of the parachute release mechanism occurs if parachute deployment or release does not occur at the correct time. A late deployment or early release of the parachute can cause a loss of the payload due to high speed ground impact. A late release may cause the parachute to drag the payload across the ground and can damage or completely destroy the payload. Existing systems have various shortcomings, drawbacks, and disadvantages relative to certain applications. Accordingly, there remains a need for further contributions in this area of technology.

SUMMARY

One embodiment of the present disclosure includes a unique parachute release mechanism that cuts a trigger cord on the parachute. Other embodiments include apparatuses, systems, devices, hardware, methods, and combinations wherein the release mechanism includes an electronic controller that determines an altitude at which the paracord cutter is activated to cut the cord. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
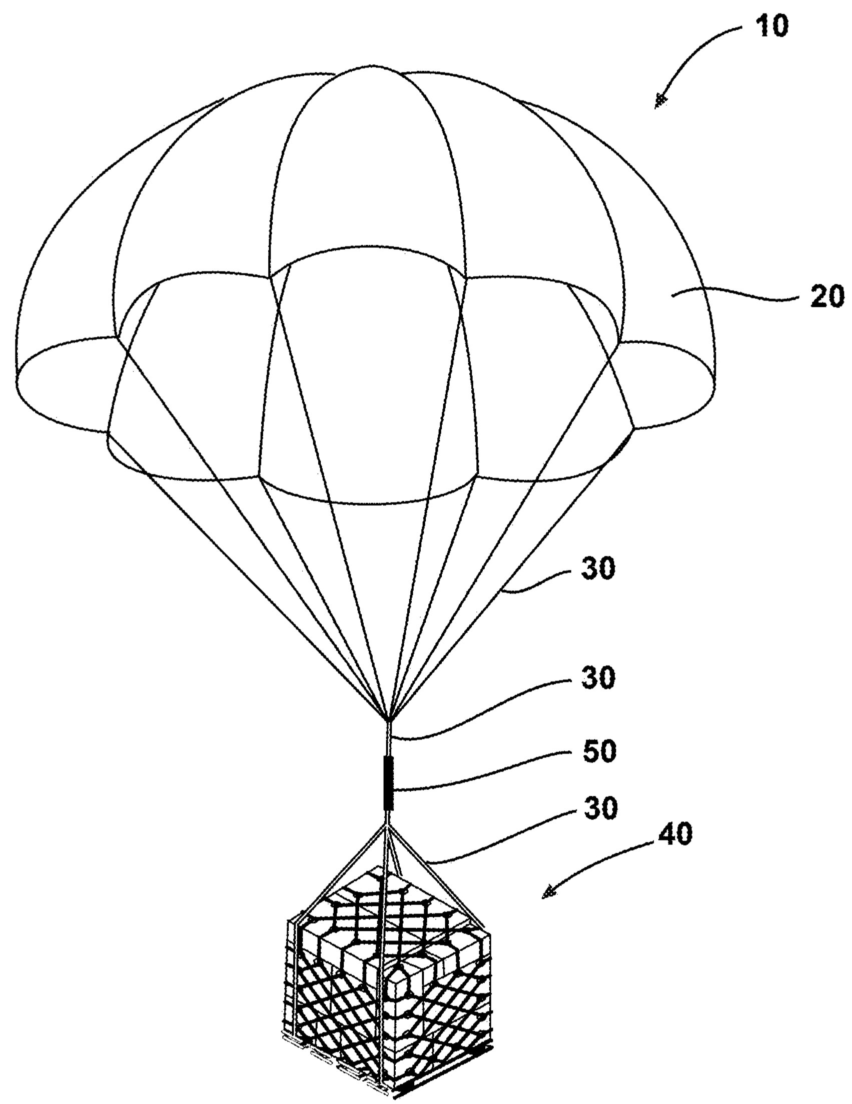
FIG. 1 is a perspective view of an exemplary deployed parachute with a payload according one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure provides a parachute release mechanism that includes a novel paracord cutting device operable to release or deploy a parachute. In one form, the parachute release mechanism can be used to deploy the parachute for an air dropped payload (human or cargo) at a predetermined altitude. In other forms, the parachute release mechanism can be used to release the parachute from the payload at a predetermined altitude above ground or upon landing on ground.

If a parachute is not released from a payload at a predetermined time, the parachute can transport the payload outside of a desired landing zone or drag the payload across the ground after landing under high wind conditions. In either circumstance, the payload may be lost or destroyed if not severed from the parachute. The parachute release mechanism disclosed herein does not interfere, impede or hinder rigging methods or procedures commonly practiced and does not require any modification or reengineering effort to use with existing parachute systems.

Referring now to FIG. 1, a perspective view is depicted of a deployed parachute system 10 according one embodiment of the present disclosure. The parachute system 10 includes a deployed parachute 20 having a plurality of cords or paracords 30 connecting the parachute to a payload 40. The payload 40 can be a cargo container as illustrated in the disclosed embodiment, but can also include human parachutists, or other articles that may be air dropped from an aircraft (not shown). One or more paracord cutter mechanism(s) 50 can be operably attached to one or more paracords 30 that connect the parachute 20 to the payload 40.

Figure 2:
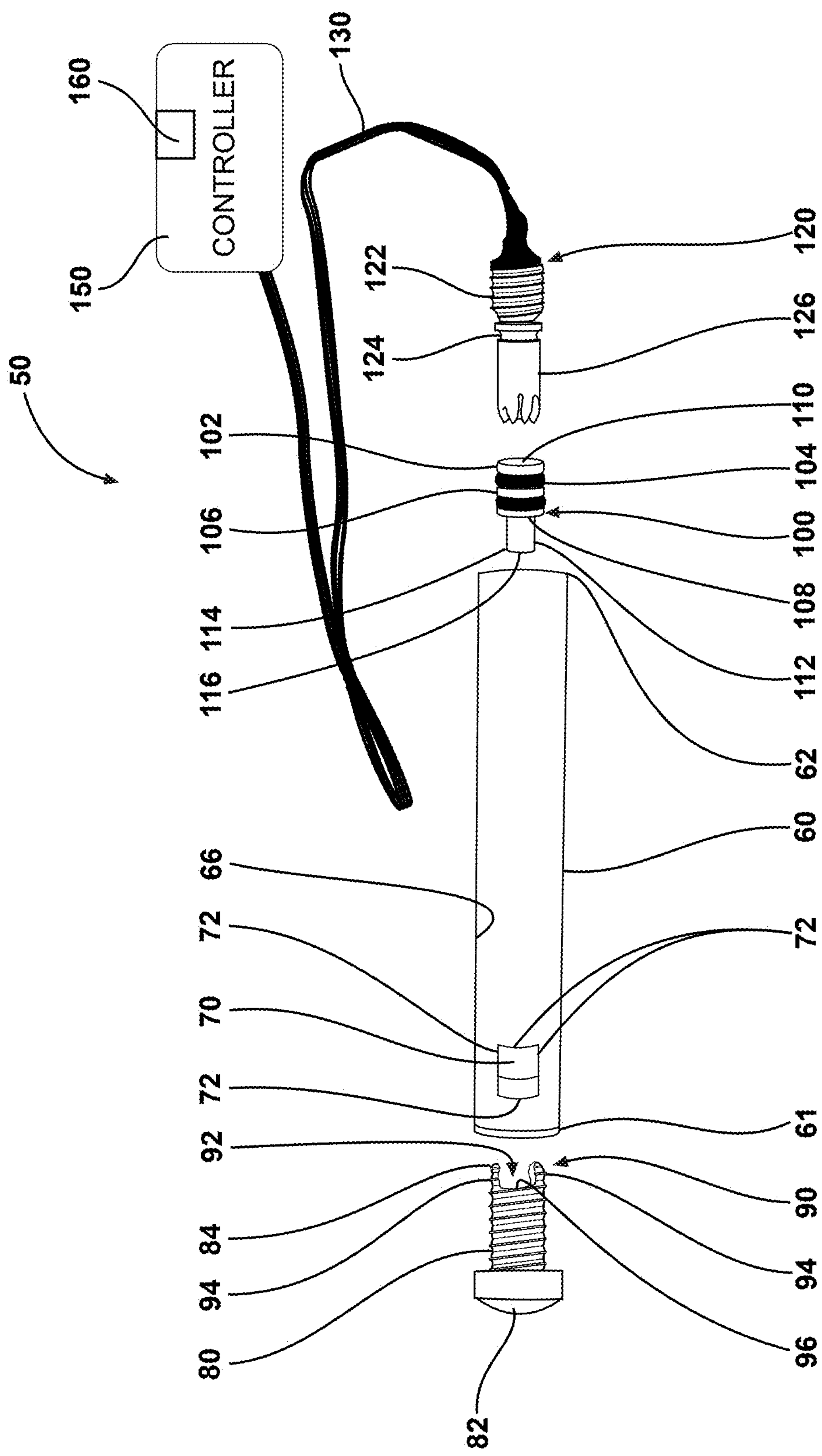
FIG. 2 is an exploded view of a paracord cutter mechanism for the parachute of FIG. 1.

FIG. 2 is an exploded view of the paracord cutter mechanism 50 that can be used to sever a paracord 30 on the parachute system 10. In one form, one or more paracords 30 are operable with a parachute release system (not shown) to facilitate deployment of the parachute 20 after dropping from an aircraft. In another form, the paracord 30 is connected to another parachute release system that is operable to separate the parachute 20 from the payload 40 at a predetermined altitude or after landing on the ground. The paracord cutter mechanism 50 includes a shuttle tube 60 extending from a first end 61 to a second end 62. In one form, each of the ends 61, 62 can include internal threads configured to receive a threaded connector. The shuttle tube 60 is further defined by a circular internal diameter 66 sized for the components required for operation of the paracord cutter mechanism 50. In other forms, the ends 61, 62 of the shuttle tube 60 may include other means for mechanical connection such as press fit, weld, braze, clips or other means known to those skilled in the art.

A paracord aperture 70 is formed though opposing sides of the shuttle tube 60. The paracord aperture 70 can simply be a circular hole with circular sidewalls 72 drilled completely through the shuttle tube 60. However, in another preferred embodiment, the paracord aperture 70 can include a square or rectangular shape with substantially straight sidewalls 72. Certain types of paracord construction (material, size and strand layout/formation) lend themselves to quicker severing when pressed against a relatively flat wall during a cutting or severing process in the disclosed system.

An end rod 80 is positioned in the first end 61 of the shuttle tube 60. In one form, the end rod 80 is a threaded rod that can threadingly engage with internal threading (not shown) in the shuttle tube 60. The threaded rod 80 can include a head 82 in the form of a screw head, nut or other means configured to permit a tool to tighten the threaded rod 80 into the shuttle tube 60. A cutting board 90 is formed in a distal end 84 of the threaded rod 80. The cutting board 90 includes a slot 92 formed through the distal end 84 with a pair of ears 94 extending therefrom. A base wall 96 forms an internal boundary wall for the slot 92. The slot 92 of the cutting board 90 is substantially aligned with the paracord aperture 70 when the threaded rod 80 is fully installed into the shuttle tube 60. Alignment occurs when the base wall 96 of the cutting board 90 and the forward most sidewall 72 of the paracord aperture 70 is at the same axial location. In operation, alignment need not be exact because the paracord (not shown) can be severed when the cutting board 90 is close to aligned. In one embodiment, the paracord aperture 70 is formed in a square configuration and perfect alignment is guaranteed when a square hole is broached through the sidewall of the shuttle tube 60 and through the end of the threaded rod 80 at the same time. However, as long as the alignment is close enough to allow the paracord to pass through the aperture 70, the paracord cutter 50 will function as intended. Since the base wall 96 is flat (in the square configuration) and the circular face of the cutter edge 114 is flat, alignment of the aperture and 70 and the cutting board 90 need not be exact to sever the paracord.

A cutter shuttle 100 is positioned within the shuttle tube 60 proximate the second end 62 after assembly of the paracord cutter mechanism 50. The cutter shuttle 100 is defined by a barrel 102 sized to closely fit within the internal diameter 66 of the shuttle tube 60. The barrel 102 can include one or more seals 104 positioned around an outer diameter 106 thereof. The seal(s) 104 can be formed from any material capable of withstanding hot high pressurized gas caused by a combustion or explosion within the shuttle tube 60. The barrel 102 extends between a forward end 108 and an aft end 110. A lance 112 protrudes from the forward end 108 of the barrel 102. The aft end 110 forms a thrust face configured to receive and react to an explosive gas force that accelerates the cutter shuttle 100 to a high rate of speed sufficient to sever a paracord which will be described in more detail below. The lance 112 includes a circular cutting edge 114 formed at the tip of the distal end thereof. In some forms the cutting edge 114 is defined by a recessed internal cup cross-sectional shape 116. The cutting edge 114 is sufficiently sharp so as to sever a paracord when the cutter shuttle 100 impacts a paracord at a high speed.

An igniter system 120 can included a threaded connector 122 configured to threadingly engage into the second end 62 of the shuttle tube 60. The igniter system 120 includes an electrode 124 extending from the threaded connector 122. The electrode is configured to transmit an electrical charge to set off an explosive cap 126. The explosive cap 126 generates a high pressure explosion that generates a pressure force directed toward the thrust face at the aft end 110 of the cutter shuttle 100. The pressure force accelerates the cutter shuttle 100 to a velocity sufficient to sever the paracord (not shown in FIG. 2). A control wire 130 provides an electrical connection between the igniter system 120 and a controller 150. The controller determines the initiation timing for the igniter system 120. Various sensors 160 can be operably integrated with the controller 150. These sensors can include, but are not limited to measurements for atmospheric pressure, temperature, altitude, acceleration, velocity or other types of data required for operation of the paracord cutter system 50 during parachute deployment and payload drop.

Figure 3:
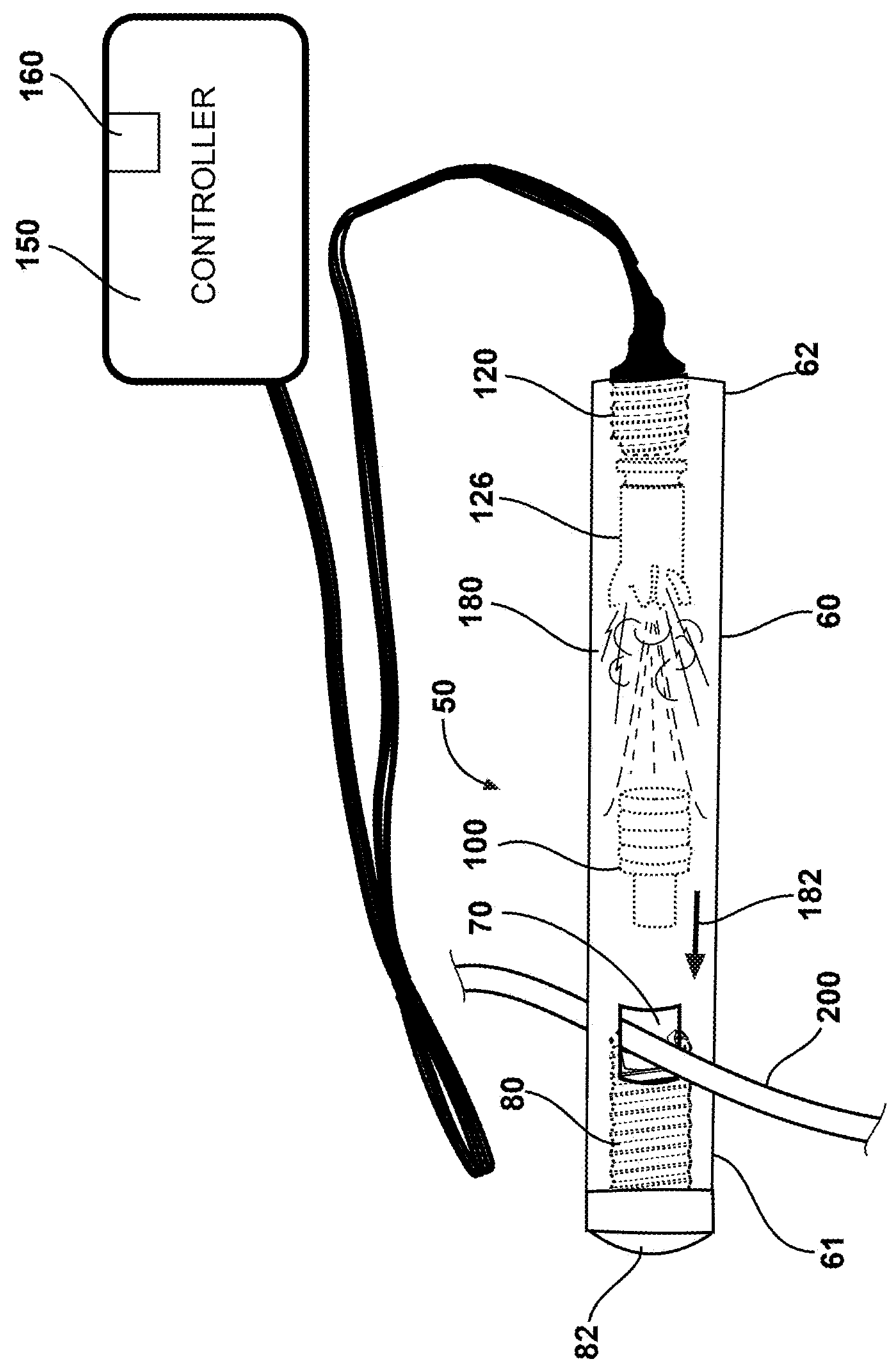
FIG. 3 is a side view of the paracord cutter mechanism of FIG. 2 showing a paracord positioned through an aperture just after ignition initiation.

Referring now to FIG. 3, a side view of the paracord cutter mechanism 50 with a paracord 200 positioned through the paracord aperture 70 of the shuttle tube 60. The explosive cap 126 is shown after an explosive ignition caused by firing of the igniter 120 by the controller 150. The explosive ignition of the explosive cap 126 causes an explosive force 180 that propels the cutter shuttle 100 at a high velocity in an axial direction from the second end 62 toward the first end 61 illustrated by arrow 182.

Figure 4:
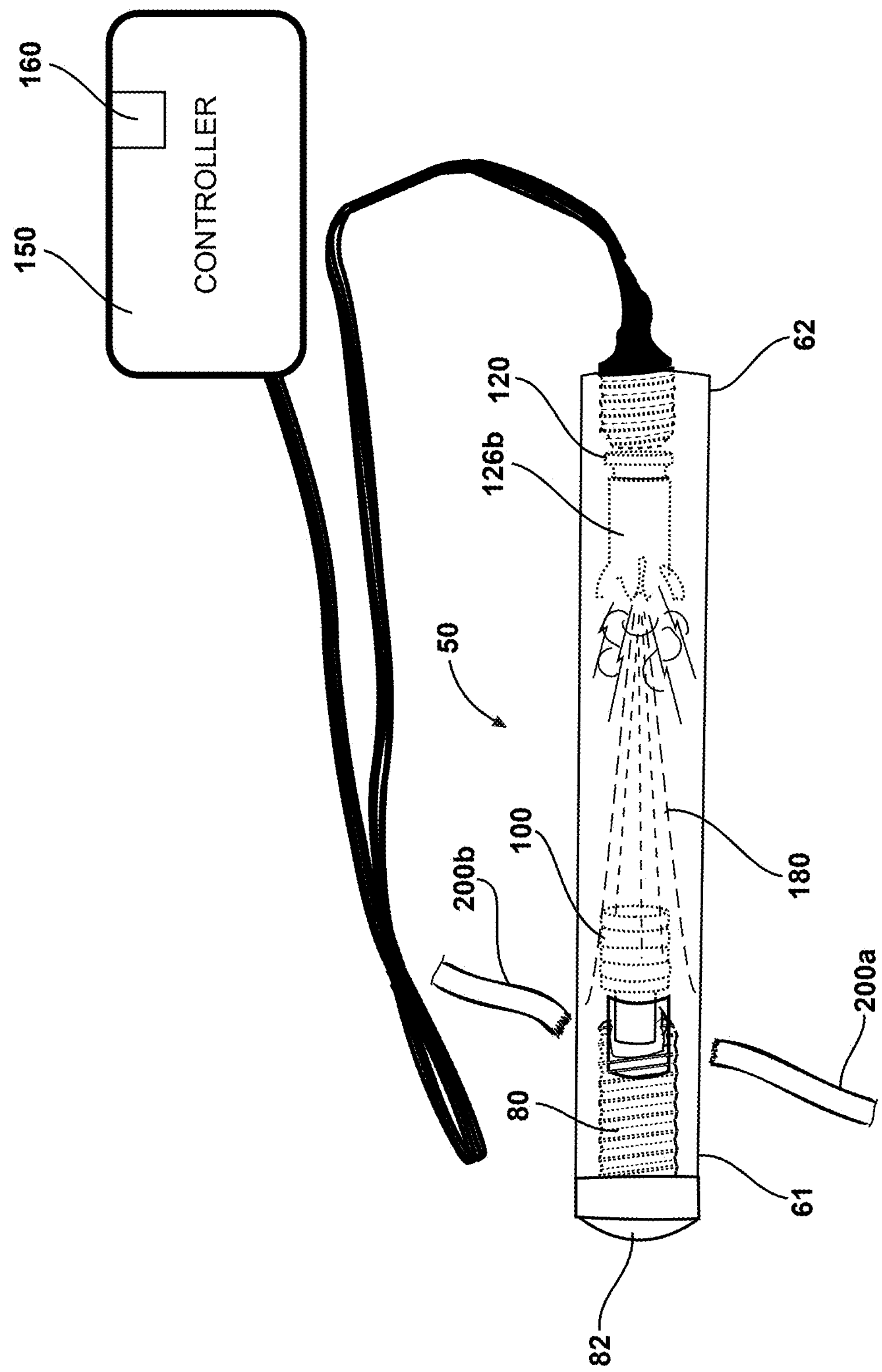
FIG. 4 is a side view of the paracord cutter mechanism of FIG. 3 after the paracord has been severed.

FIG. 4 shows the paracord cutter mechanism 50 after the paracord 200 has been severed into two segments *200a*, *200b* by the cutting edge 114 of the cutter shuttle 100. The explosive force accelerates the cutter shuttle 100 to velocity that is sufficient to sever the paracord 200.

In operation, the cutting edge 114 of the cutter shuttle 100 engages the paracord 200 and moves the paracord 200 into the cutting board of the threaded rod 80 such that the ears 92 contact the cord 200 to prevent that portion of the paracord 200 from moving further forward while the cutting edge 114 continues to move forward and slice or otherwise cut through the paracord 200. The cutter shuttle 100 is stopped after the forward end 108 of the barrel 102 reaches the basewall 96 of the cutting board 90 after the cutting edge 114 passes through the paracord 200 and moves into the slot 92 of the cutting board 90.

In one embodiment, the shuttle tube 60 can be formed with a 3 inch long 9⁄16" steel bar. A central hole is drilled through the axial length of the bar. The central hole can then be internally tapped either end to threadingly receive a threaded rod 80 and an igniter 120, respectively. A starter hole is then drilled at 90 degrees through the tube 60 proximate the first end 61 through the end of the threaded rod to simultaneously make the cutting board 90. This 90 degree hole can then be broached to form a square or rectangular shape. The cutter shuttle 100 can be made from round bar stock that is slightly smaller than the diameter of the central hole. Two seal grooves can be machined into the barrel 102 and seals such as O-rings can be inserted to seal against the gases to be produced by the pyrotechnic device. The cutting edge 114 of the cutter shuttle 100 is machined into a circular cutting edge that matches the size of the slot 92 that defines the cutting board 90.

In one embodiment, the cutter shuttle 100 can be made from a material that is harder than the material that forms the cutting board 90. By way of example and not limitation, the material of the cutter shuttle can be a hardened tool steel or the like and the material for the cutting board 90 can be a softer material such as brass or the like. This will ensure the cutter shuttle 100 will embed into the cutting board 90 as opposed to bouncing back when impacting at high speed during the cutting operation.

In one aspect the present disclosure includes a paracord cutting apparatus comprising: a paracord shuttle tube extending between first and second ends; a paracord aperture formed through the shuttle tube proximate the first end thereof; a rod engaged with the first end of the shuttle tube; a cutting board formed at a distal end of the rod; a cutter shuttle configured to travel within the shuttle tube; and an igniter connected with the shuttle tube proximate the second end thereof.

In refining aspects of the paracord cutting apparatus, a paracord is positioned through the paracord aperture of the shuttle tube and the cutting board of the rod; wherein the rod is threaded and the paracord aperture includes a plurality of straight sidewalls; the cutter shuttle includes a seal positioned around a circumferential wall; wherein the seal of the cutter shuttle engages an internal wall of the shuttle tube when moving from the second end toward the first end; further comprising an explosive cap disposed within the shuttle tube; wherein the igniter detonates the explosive cap to generate pressure force to accelerate the cutter shuttle toward the cutting board within the shuttle tube; further comprising a controller operably connected to the igniter to control detonation timing; wherein the cutter shuttle includes barrel with a protruding lance extending therefrom sized to fit within the cutting board of the rod; further comprising a cutting edge formed on the distal end of the protruding lance; wherein the cutting board includes a pair of ears with a slot formed therebetween and a base wall axially aligned with a forward wall of the paracord aperture; and wherein the paracord aperture includes a plurality of straight sidewalls.

In another aspect, a parachute release device comprises: a shuttle tube extending between first and second ends; a paracord aperture formed through the tube proximate the first end thereof; a threaded rod threadingly engaged into the first end of the tube; a cutting board formed at a distal end of the threaded rod; a cutter shuttle configured to travel from the second end of the tube toward the first end of the tube; an igniter engaged with the tube proximate the second end; and a pyrotechnic explosive cap operably connected to the igniter.

In refining aspects, the parachute release device includes a paracord positioned through the aperture of the shuttle tube; wherein the igniter generates a voltage to initiate detonation of the explosive cap within the shuttle tube; wherein the cutter shuttle accelerates toward the cutting board after detonation of the explosive cap; wherein the cutter shuttle forces the paracord into the cutting board and severs the paracord; and wherein a parachute is either deployed or detached upon severing of the paracord.

In another aspect, the present disclosure includes a method for releasing a parachute comprising: inserting a paracord through an aperture in a shuttle tube; igniting an explosive device in the shuttle tube; accelerating a cutter shuttle in the shuttle tube toward the paracord with the explosive force generated by the explosive device; forcing the paracord into a cutting board with the cutter shuttle; severing the paracord with a cutter edge extending from the cutter shuttle and deploying or detaching a parachute in response to the severing of the paracord.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A paracord cutting apparatus comprising:

a paracord shuttle tube extending between first and second ends;

a paracord aperture formed through the shuttle tube proximate the first end thereof;

a rod engaged with the first end of the shuttle tube;

a cutting board formed at a distal end of the rod;

a cutter shuttle configured to travel within the shuttle tube;

an igniter connected with the shuttle tube proximate the second end thereof; and wherein the cutter shuttle includes barrel with a protruding lance extending therefrom sized to fit within the cutting board of the rod.

2. The paracord cutting apparatus of claim 1, wherein a paracord is positioned through the paracord aperture of the shuttle tube and the cutting board of the rod.

3. The paracord cutting apparatus of claim 1, wherein the rod is threaded and the paracord aperture includes a plurality of straight sidewalls.

4. The paracord cutting apparatus of claim 1, wherein the cutter shuttle includes a seal positioned around a circumferential wall.

5. The paracord cutting apparatus of claim 4, wherein the seal of the cutter shuttle engages an internal wall of the shuttle tube when moving from the second end toward the first end.

6. The paracord cutting apparatus of claim 1, further comprising an explosive cap disposed within the shuttle tube.

7. The paracord cutting apparatus of claim 6, wherein the igniter detonates the explosive cap to generate pressure force to accelerate the cutter shuttle toward the cutting board within the shuttle tube.

8. The paracord cutting apparatus of claim 1, further comprising a controller operably connected to the igniter to control detonation timing.

9. The paracord cutting apparatus of claim 1, further comprising a cutting edge formed on the distal end of the protruding lance.

10. The paracord cutting apparatus of claim 1, wherein the cutting board includes a pair of ears with a slot formed therebetween and a base wall axially aligned with a forward wall of the paracord aperture.

11. The paracord cutting apparatus of claim 1, wherein the paracord aperture includes a plurality of straight sidewalls.

12. A parachute release device comprising:

a shuttle tube extending between first and second ends;

a paracord aperture formed through the tube proximate the first end thereof;

a threaded rod threadingly engaged into the first end of the tube;

a cutting board formed at a distal end of the threaded rod;

wherein the paracord aperture and the cutting board is formed with a machining process at the same time such that the paracord aperture in the tube and the cutting board is in alignment after assembly;

a cutter shuttle configured to travel from the second end of the tube toward the first end of the tube;

an igniter engaged with the tube proximate the second end; and a pyrotechnic explosive cap operably connected to the igniter.

13. The parachute release device of claim 12, wherein a paracord positioned through the aperture of the shuttle tube.

14. The parachute release device of claim 12, wherein the igniter generates a voltage to initiate detonation of the explosive cap within the shuttle tube.

15. The parachute release device of claim 13, wherein the cutter shuttle accelerates toward the cutting board after detonation of the explosive cap.

16. The parachute release device of claim 12, wherein the cutter shuttle forces the paracord into the cutting board and severs the paracord.

17. The parachute release device of claim 16, wherein a parachute is either deployed or detached upon severing of the paracord.

18. A method for releasing a parachute comprising:

Inserting a paracord through an aperture in a shuttle tube;

igniting an explosive device in the shuttle tube;

accelerating a cutter shuttle in the shuttle tube toward the paracord with the explosive force generated by the explosive device;

forcing the paracord into a cutting board with a lance extending from the cutter shuttle; and severing the paracord with a cutter edge formed on the lance.

19. The method of claim 18, deploying or detaching a parachute in response to the severing of the paracord.

20. A paracord cutting apparatus comprising:

a paracord shuttle tube extending between first and second ends;

a paracord aperture formed through the shuttle tube proximate the first end thereof;

a rod engaged with the first end of the shuttle tube;

a cutting board formed at a distal end of the rod;

a cutter shuttle configured to travel within the shuttle tube;

an igniter connected with the shuttle tube proximate the second end thereof; and wherein the cutting board includes a pair of ears with a slot formed therebetween and a base wall axially aligned with a forward wall of the paracord aperture.

* * * * *